(12) United States Patent
Ye et al.

(10) Patent No.: US 9,767,592 B2
(45) Date of Patent: Sep. 19, 2017

(54) ANIMATING CONTENT DISPLAY

(71) Applicant: Alibaba Group Holding Limited, George Town, KY (US)

(72) Inventors: Tingmeng Ye, Hangzhou (CN); Yiming Wu, Hangzhou (CN)

(73) Assignee: Alibaba Group Holding Limited (KY)

( * ) Notice: Subject to any disclaimer, the term of this patent is extended or adjusted under 35 U.S.C. 154(b) by 349 days.

(21) Appl. No.: 14/682,896

(22) Filed: Apr. 9, 2015

(65) Prior Publication Data
US 2015/0302628 A1  Oct. 22, 2015

(30) Foreign Application Priority Data

Apr. 18, 2014 (CN) .......................... 2014 1 0157744

(51) Int. Cl.
| | |
|---|---|
| G06F 3/048 | (2013.01) |
| G06T 13/80 | (2011.01) |
| G06F 3/0483 | (2013.01) |
| G06F 3/0484 | (2013.01) |
| H04N 21/431 | (2011.01) |
| G06F 3/0485 | (2013.01) |
| G06F 3/0481 | (2013.01) |
| H04N 21/482 | (2011.01) |

(52) U.S. Cl.
CPC ............ G06T 13/80 (2013.01); G06F 3/0483 (2013.01); G06F 3/0485 (2013.01); G06F 3/04817 (2013.01); G06F 3/04842 (2013.01); G06F 3/04845 (2013.01); G06F 3/04847 (2013.01); H04N 21/4312 (2013.01); H04N 21/4314 (2013.01); H04N 21/4821 (2013.01)

(58) Field of Classification Search
CPC ....................................................... G06T 13/80
USPC ........................................................ 715/838
See application file for complete search history.

(56) References Cited

U.S. PATENT DOCUMENTS

| | | | |
|---|---|---|---|
| 6,717,576 B1 * | 4/2004 | Duluk, Jr. ............. | G06T 15/005 345/419 |
| 6,816,176 B2 | 11/2004 | Laffey et al. | |
| 8,531,713 B2 | 9/2013 | Shoji et al. | |
| 8,589,815 B2 | 11/2013 | Fong et al. | |
| 9,218,683 B2 * | 12/2015 | Lau .......................... | G06T 13/80 |
| 9,430,458 B2 * | 8/2016 | Rhee ..................... | G06F 17/245 |
| 9,547,437 B2 * | 1/2017 | Fino .................. | G06F 17/30849 |

(Continued)

OTHER PUBLICATIONS iPadJailBroken "3D Icon Transition for iPad Mini With Barrel [Cydia]" Feb. 12, 2010, Accessed at https://www.youtube.com/watch?v=FLAzPMV2RAU on Jun. 17, 2015.

(Continued)

*Primary Examiner* — William Titcomb
(74) *Attorney, Agent, or Firm* — Van Pelt, Yi & James LLP

(57) ABSTRACT

Animating content display is disclosed, including: receiving a move command associated with moving a plurality of grid cells relative to a display area of a screen, wherein the plurality of grid cells comprises pieces of content; and in response to the move command, moving, using a processor, each of at least a subset of the plurality of grid cells sequentially relative to the display area based at least in part on preset frame parameter information, wherein the preset frame parameter information comprises a frame animation quantity parameter and a frame delay parameter.

19 Claims, 9 Drawing Sheets

(56) References Cited

U.S. PATENT DOCUMENTS

| | | | | |
|---|---|---|---|---|
| 2005/0231512 | A1* | 10/2005 | Niles | G06T 13/20 345/473 |
| 2006/0214935 | A1* | 9/2006 | Boyd | G06F 9/4428 345/473 |
| 2009/0113300 | A1* | 4/2009 | Tuli | H04M 1/72522 715/716 |
| 2010/0097384 | A1* | 4/2010 | Jung | G06Q 50/184 345/473 |
| 2010/0241955 | A1* | 9/2010 | Price | G06F 3/0425 715/702 |
| 2010/0313156 | A1* | 12/2010 | Louch | G06F 3/0481 715/769 |
| 2011/0126156 | A1* | 5/2011 | Krishnaraj | G06F 3/016 715/828 |
| 2012/0216117 | A1* | 8/2012 | Arriola | H04N 21/4821 715/716 |
| 2012/0299933 | A1 | 11/2012 | Lau et al. | |
| 2013/0055058 | A1* | 2/2013 | Leong | G06F 17/246 715/219 |
| 2013/0055061 | A1* | 2/2013 | Ashley-Rollman | G06F 17/245 715/228 |
| 2013/0238724 | A1* | 9/2013 | Cunningham | H04L 51/24 709/206 |
| 2013/0328888 | A1* | 12/2013 | Beaver | G06T 13/80 345/473 |
| 2017/0038917 | A1* | 2/2017 | Reicher | G06F 3/0482 |

OTHER PUBLICATIONS

Ben Packard "The Dark Sky Staggered Slide-in Animation" Mar. 10, 2014, Accessed at http://www.benpackard.org/blog/?p=36 on Jun. 16, 2015.

Anonymous "ios—Animating elements of views that are being transitioned to—Stack Overflow" Mar. 10, 2014, Accessed at http://stackoverflow.com/questions/21819043/animating-elements-of-views-that-are-being-transitioned-to on Jun. 16, 2015.

* cited by examiner

ANIMATING CONTENT DISPLAY

CROSS REFERENCE TO OTHER APPLICATIONS

This application claims priority to People's Republic of China Patent Application No. 201410157744.4 entitled A GRID-MOVING DISPLAY PROCESSING METHOD AND A SYSTEM THEREOF, filed Apr. 18, 2014 which is incorporated herein by reference for all purposes.

FIELD OF THE INVENTION

The present application relates to a display device technology. In particular, the present application relates to techniques of displaying grid-based content at a display device.

BACKGROUND OF THE INVENTION

As science and technology develop, television sets have developed towards increasing functionality and intelligence. In addition to their traditional video and gaming functions, smart televisions may also have network functions that enable them to perform cross-platform searches between televisions, the Internet, and programs. After computers and mobile phones, smart televisions are becoming the third type of information access terminal. Increasingly, users can access (e.g., through searching) the information that they need through smart televisions.

Unlike traditional television sets, smart televisions interact with users and thus implement operation and control functions by providing a user interface (UI). A smart television commonly displays content that a user may browse through as a scrolling grid of content or as pages of content arranged in a grid. When the user needs to select from the displayed content, the user may use a remote device to browse through the grid of content.

In the "grid-scrolling" display mode, a graphic card is configured to display up to a predetermined quantity of content in a grid arrangement at a display area of a screen. As the user requests for content outside of the display area, at least some content that is currently displayed at the display screen will no longer be displayed and content that is not currently displayed will be introduced into the display area. Such an approach to displaying content can let the user glance at batches of content, permitting the user sufficient time to identify and select a piece of content to browse further. In the "page-turning grid" display mode, up to a predetermined quantity of content in a grid arrangement is displayed per page and when a user requests for a different page of content, the content of the currently displayed page will no longer be displayed and the new content of the requested page will be displayed instead. Such an approach permits the user to have sufficient observation time for each page of displayed content and also an efficient view of the grid display.

However, conventionally, regardless of whether the scrolling grid of content display mode or the page-turning grid display mode is used, the new content is abruptly displayed in the display area of the screen without any animation. Due to the lack of animation, the change of displayed content may not appear very fluid and may not provide a very good user experience.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of animating content display are described herein. A move command associated with moving a plurality of grid cells relative to a display area of a screen is received. Each grid cell is associated with a piece of content. The screen that includes the display area is part of a display device, such as a smart television. In response to the move command, each of the grid cells is sequentially moved relative to the display area based at least in part on preset frame parameter information. The preset frame parameter information includes a frame animation quantity parameter and a frame delay parameter. The movement of the grid cells into the display area is animated according to the frame animation quantity parameter and the frame delay parameter such that the grid cells appear to move in a staggered fashion.

Figure 1:
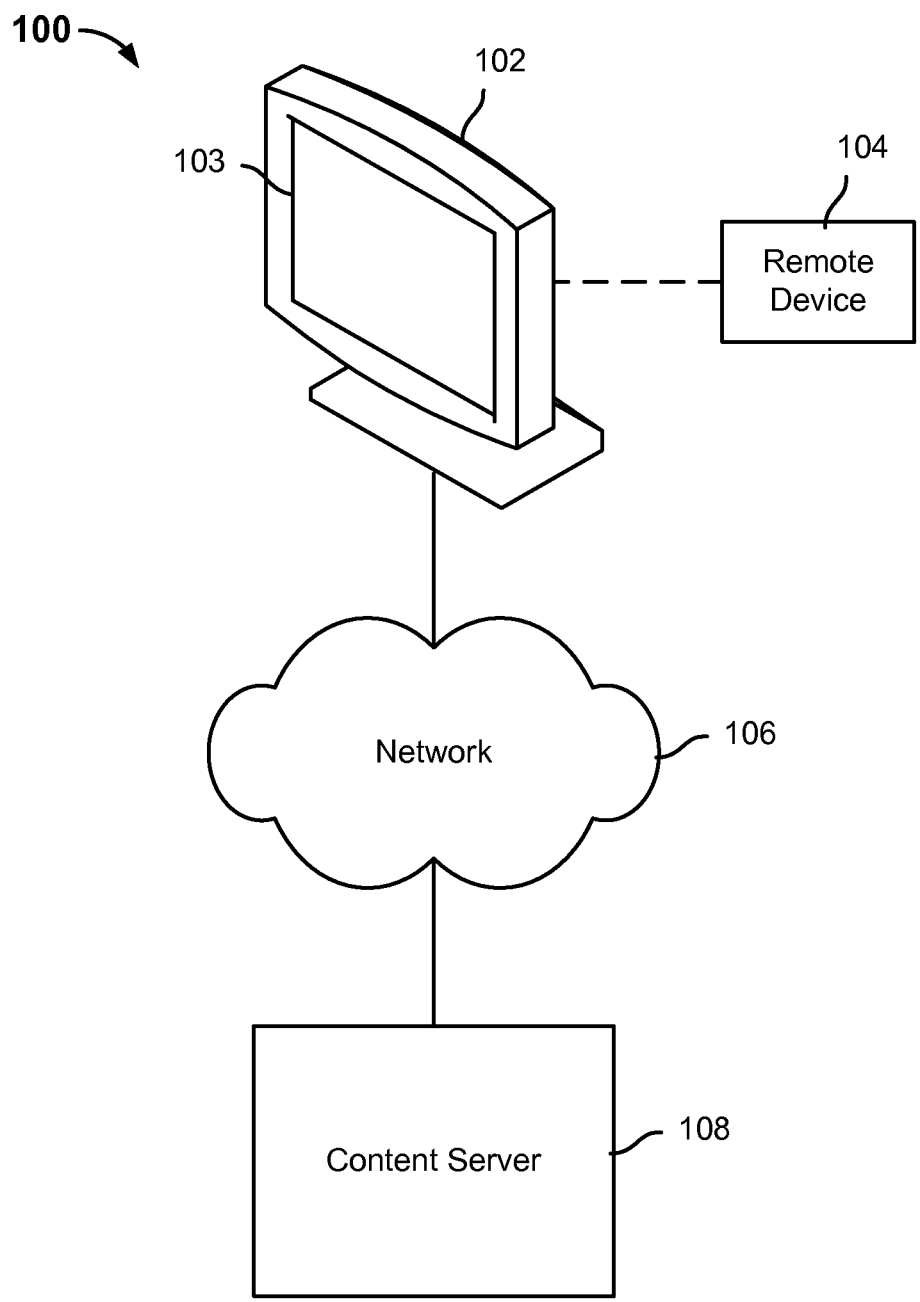
FIG. 1 is a diagram showing an embodiment of a system for animating content display.

FIG. 1 is a diagram showing an embodiment of a system for animating content display. In the example, system 100 includes smart television 102, remote device 104, network 106, and content server 108. Network 106 includes high-speed data networks and/or telecommunications networks.

Smart television 102 comprises a television system that is configured with networking functions (e.g., such that smart television 102 is able to send and receive information over network 106), a display screen, and is able to run one or more operating systems with extensible functions. Smart television 102 is configured to receive commands from remote device 104. Remote device 104 comprises any device that is configured to send and/or receive data from smart television 102 (e.g., over network 106). For example, remote device 104 comprises a remote control that is configured to communicate with smart television 102 or a mobile device (e.g., a smart phone or a tablet device). A user operating remote device 104 may input selections (e.g., press buttons) on remote device 104 to send a command to smart television 102 and to cause a corresponding action to be performed at smart television 102.

Smart television 102 is configured to obtain content to display at a display area in its display screen from content server 108 over network 106. In various embodiments, the obtained pieces of content are arranged in a grid arrangement and to be displayed by smart television 102 at the display area of display screen 103 as a grid of rows and columns. The grid includes rows and columns of pieces of content. In various embodiments, because each piece of content is displayed as part of a grid, a piece of content is referred to as a "grid cell." Grid cells of content may be arranged in an order based on any appropriate ranking (e.g., alphabetical, availability date, popularity). In various embodiments, a piece of content may include an image associated with a piece of media (e.g., a song, a video, a photograph, etc.) that a user can select via remote device 104 to request additional data associated with that piece of media.

Figure 2:
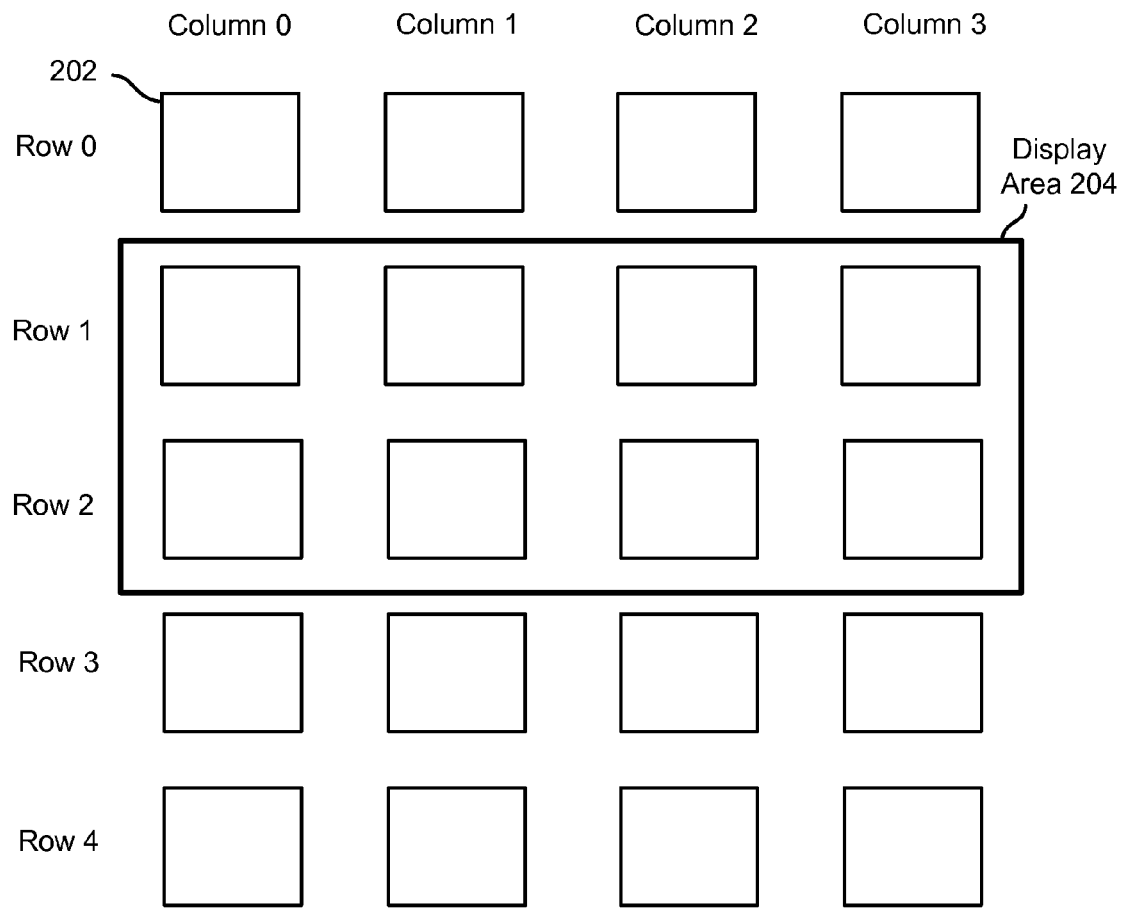
FIG. 2 shows an example of various pieces of content arranged in a grid of rows and columns.

Because smart television 102 has typically obtained more content than can be displayed at one time in the display area of display screen 103, only a subset of the entire obtained grid of pieces of obtained content can be displayed at a time in the display area of smart television 102. FIG. 2 shows an example of various pieces of content arranged in a grid of rows and columns. In the example of FIG. 2, there are four columns (Columns 0, 1, 2, and 3) and five rows (Rows 0, 1, 2, 3, and 4) of pieces of content such as piece of content 202. Each piece of content is also referred to as a "grid cell" and can be identified by a corresponding column value and row value. For example, piece of content 202 can also be identified by its (column, row) value of (0, 0). While there are 20 total pieces of content in the example grid of FIG. 2, an example smart television (e.g., smart television 102 of FIG. 1) can only display up to eight pieces of content (eight grid cells) in display area 204 at a time. As shown in the example of FIG. 2, display area 204 of the smart television can only display the eight pieces of content of Rows 1 and 2, where each row displays four pieces of content.

Returning to FIG. 1, in some embodiments, smart television 102 is configured to display obtained content in the "grid-scrolling" display mode, the "page-turning grid" display mode, and/or any other display mode of a grid of content. A user can use (e.g., a directional pad of) remote device 104 to send a (e.g., up, down, right, or left) direction-based move command to browse through the displayed grid cells and also cause different grid cells to be displayed at the display area of smart television 102. In the "grid-scrolling" display mode, a user can use remote device 104 to scroll through the grid cells at smart television 102 to cause at least some currently displayed grid cells (e.g., a currently displayed row or column of grid cells) to move within or out of the display area and cause some currently not displayed grid cells (e.g., a new row or column of grid cells) to move into the display area. For example, in the "grid-scrolling" display mode, a selection cursor on the display area of smart television 102 can be moved by the user via remote device 104 to select a particular grid cell and the user can scroll through the content by moving the selection cursor out of the currently displayed set of grid cells. In the "page-turning grid" display mode, a user can use remote device 104 to change the page of grid cells that is displayed at smart television 102, where in response to each newly requested page, the entire currently displayed page of grid cells is no longer displayed in the display area and the grid cells of the new page are displayed in the display area instead. For example, in the "page-turning grid" display mode, a selection cursor on the display area of smart television 102 can be moved by the user via remote device 104 to select a particular grid cell and the user can select a new page of content by either moving the selection cursor out of the currently displayed set of grid cells and/or by selecting (e.g., double clicking) a button associated with flipping to a different page.

As will be described in detail below, various embodiments described herein animate the movement of the grid cells into the display area of a display device (e.g., a smart television) in response to a received command. The animation of the movement of the grid cells causes them to appear to move sequentially and in a staggered fashion into the display area for a more dynamic and visually smooth presentation.

Figure 3:
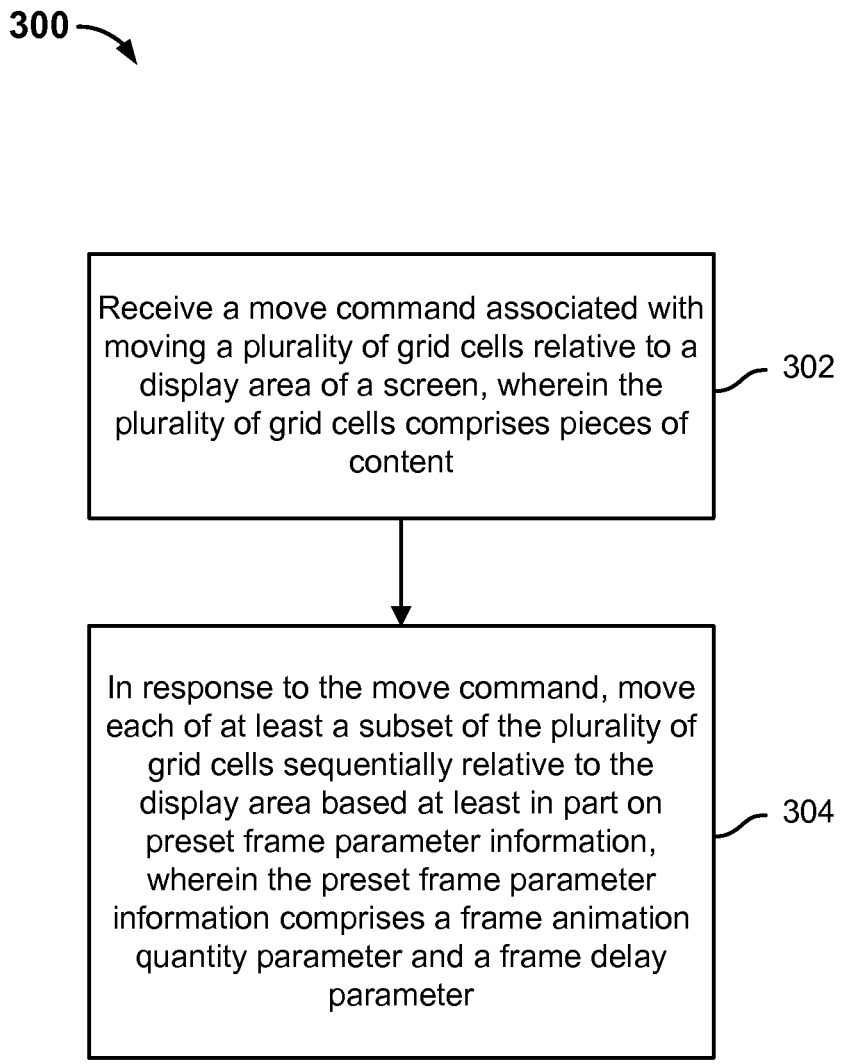
FIG. 3 is a flow diagram showing an embodiment of a process for animating content display.

FIG. 3 is a flow diagram showing an embodiment of a process for animating content display. In some embodiments, process 300 is implemented at system 100 of FIG. 1. In some embodiments, process 300 is implemented at a display device. For example, the display device comprises a smart television.

At 302, a move command associated with moving a plurality of grid cells relative to a display area of a screen is received, wherein the plurality of grid cells comprises pieces of content. A move command is received from a remote device. The grid cells are arranged in a row by column grid. Each grid cell can be identified by a corresponding row value and column value. For example, the move command may be issued when a user operating the remote device directs a selection cursor on the display screen to an area that is outside of the display screen.

The move command can be issued to cause at least some of the not currently displayed grid cells located in the area to which the selection cursor was directed to move into the display area. In some embodiments, grid cells that are currently displayed in the display area may also be moved within or out of the display area in response to the move command.

In various embodiments, the move command comprises: move sequence information and destination position information. In some embodiments, the "move sequence information" refers to the sequence in which individual or batches of multiple grid cells that are to be moved in response to the move command are to be moved one after another in the animation and also the direction in which each grid cell (or each batch of multiple grid cells) is to be moved into the display area. For example, the "move sequence information" identifies which grid cell is to be moved first in the animation and in which direction (e.g., rightward, leftward, downward, and upward) into the display area, which grid cell is to be moved second and in which direction into the display area, which grid cell is to be moved third and in which direction into the display area, . . . , and which grid cell is to be moved last and in which direction into the display area. In particular, the grid cell that is to be moved first in the animation as identified by the "move sequence information" is sometimes referred to as the "first grid cell" and could be any of the following grid cells, for example, within the grid: the grid cell at the leftmost position in a row that is to be moved (e.g., the grid cell at (column, row) value of (1, 1)), the grid cell near the middle of a row that is to be moved (e.g., the grid cell at (column, row) value of (2, 0)), the grid cell at the rightmost position in a row that is to be moved (e.g., the grid cell at (column, row) value of (3, 4)), etc. Other examples of the first grid cell to be moved can be used as well.

Figure 4A:
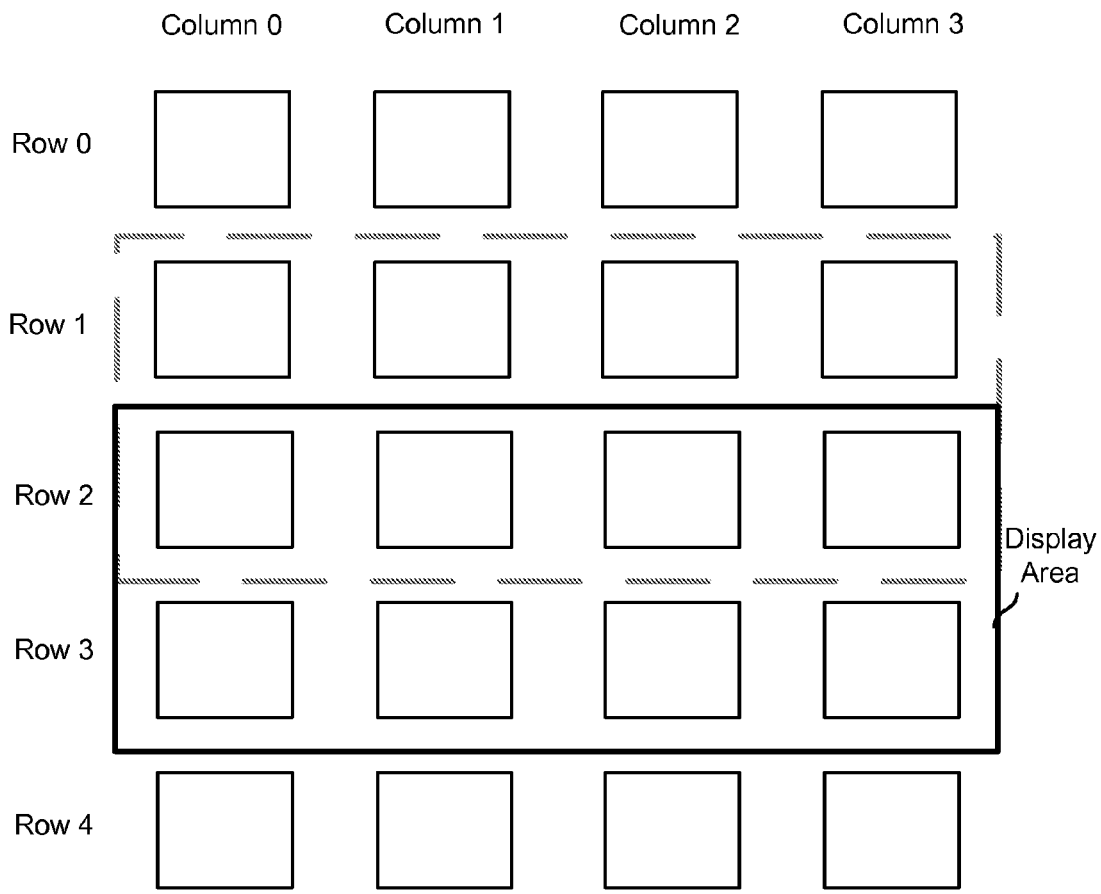
FIG. 4A shows an example of the effect of a move command in a "grid-scrolling" display mode.
Figure 4B:
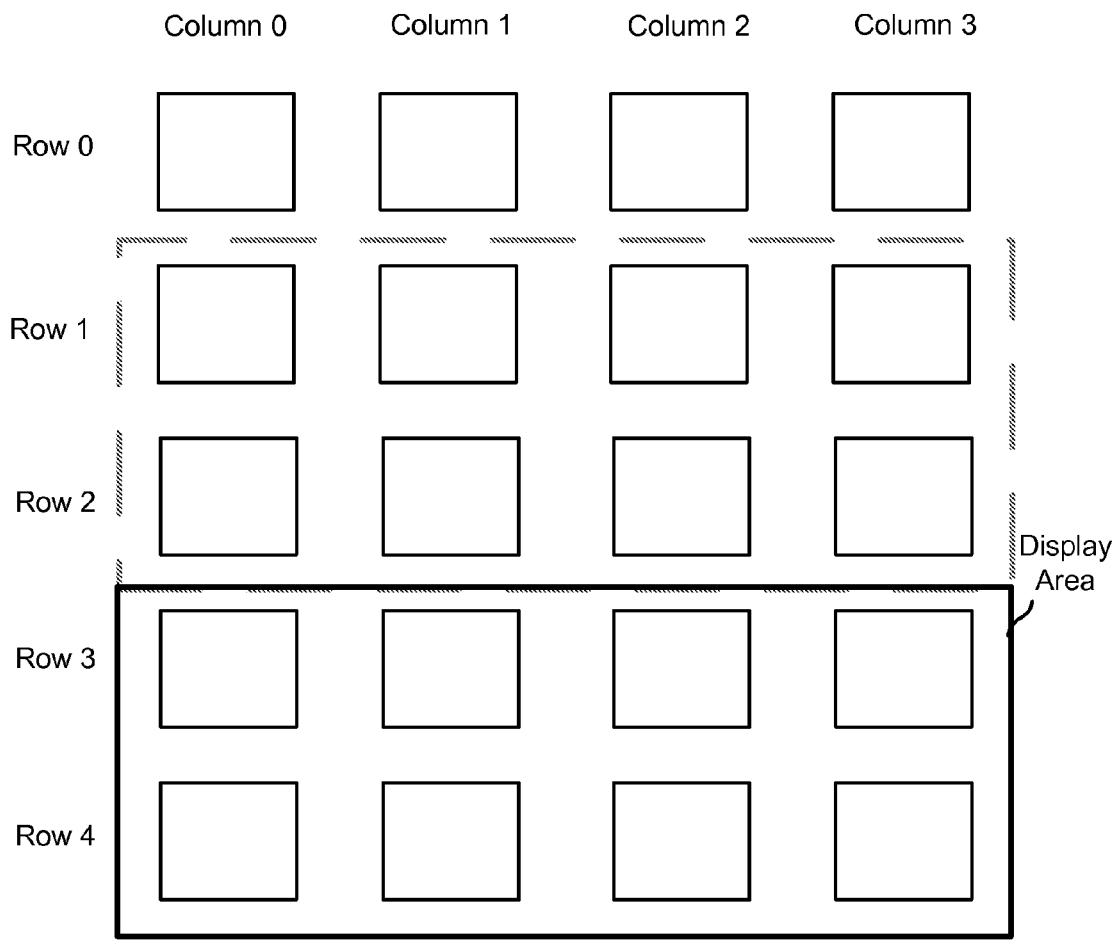
FIG. 4B shows an example of the effect of a move command in a "page-turning grid" display mode.

In some embodiments, the same move command may cause different grid cells to be moved in and/or out of the display area depending on the type of display mode that is used. FIG. 4A shows an example of the effect of a move command in a "grid-scrolling" display mode. In the example of FIG. 4A, before a move command was received, the display area included the grid cells of Rows 1 and 2 of the grid. Then, a move command in the down direction is received and in response, the pieces of content of Rows 2 and 3 of the grid are to be displayed in the display area instead. For example, the move command was issued to view the grid cell at the (column, row) value of (0, 2). In response to the move command, the grid cells of Row 1 are to be moved out of the display area, the grid cells of Row 2 are to be moved up to the top row of the display area and the grid cells of Row 3 are to be moved up into the bottom row of the display area. FIG. 4B shows an example of the effect of a move command in a "page-turning grid" display mode. In the example of FIG. 4B, before a move command was received, the display area included the grid cells of Rows 1 and 2 of the grid. For example, the move command was issued to view the grid cell at the (column, row) value of (0, 2). Then, a move command in the down direction and/or for the next page of content is received and in response, the grid cells of Rows 3 and 4 of the grid are to be displayed in the display area instead. In response to the move command, the grid cells of both Rows 1 and 2 are to be moved out of the display area and the grid cells of Rows 3 and Row 4 are to be moved up into the display area.

In some embodiments, each grid cell that is to be moved into the display area in response to the move command is identified. In some embodiments, each grid cell that is either to be moved within or into the display area in response to the move command is identified.

In some embodiments, the "destination position information" included in the move command comprises the respective destination position of each grid cell after it has been moved within or into the display area. In some embodiments, the destination position comprises a position/location inside the display area to which a grid cell is to be moved. For example, if the display area can display a total of eight grid cells in two rows of four grid cells each, then the destination position of each grid cell may be one of the eight positions of the display area.

Whereas conventionally, grid cells that are moved into the display area immediately/directly/abruptly appear at their respective destination positions in the display area, embodiments described herein animate the manner in which pieces of content to be moved are moved from their initial positions to their respective destination positions in response to the move command. While the move command determines which grid cells and the direction in which they should be moved within or into the display area, step 304 determines how the movement of these grid cells will be presented in an animated form.

At 304, in response to the move command, each of at least a subset of the plurality of grid cells is sequentially moved relative to the display area based at least in part on preset frame parameter information, wherein the preset frame parameter information comprises a frame animation quantity parameter and a frame delay parameter.

In some embodiments, each grid cell that is to be moved into the display area is sequentially moved based on the preset frame parameter information. In some embodiments, each grid cell that is to be moved within the display area is also sequentially moved based on the preset frame parameter information. In various embodiments, each of the grid cells that is to be moved within and/or into the display area is sequentially moved based on the preset frame parameter information. In some embodiments, the frame parameter information can be preset by an administrator. In various embodiments, the preset frame parameter information includes: a frame animation quantity parameter and a frame delay parameter. In various embodiments, the "frame animation quantity parameter" refers to the number of animation frames that are to be presented in order to animate the movement of a grid cell that is to be moved from its respective initial position to its respective destination position. In some embodiments, the "initial position" of a grid cell refers to the position it was in relative to the display area prior to the move command. For example, if a grid cell were located outside of the display area prior to the move command, then the initial position of the grid cell would be one of above, below, to the left, or to the right of the display area. As mentioned above, the "destination position" of a grid cell refers to the position it will move to inside the display area subsequent to the move command. For example, if a grid cell were located outside of the display area prior to the move command, then the destination position of the cell would be inside the display area in a row of grid cells within the display area. In some embodiments, the same frame animation quantity parameter is set for one or more types of display modes (e.g., grid-scrolling or page-turning grid). In some embodiments, one frame animation quantity parameter is set for the entire grid. Put another way, the movement of each grid cell in the entire grid of cells from that grid cell's respective initial position to its respective destination position is to be animated based on the one preset frame animation quantity parameter. In order to achieve a smooth-flowing animation effect, the frame parameter information can be preset such that the animation of each grid cell from its initial position to its destination position can be completed in half a second or less. For example, if the display device (e.g., smart television) can present animation at 30-60 frames in one second, then it is assumed that the display device can present animation at 15-30 frames in half a second or less. As such, for example, the frame animation quantity parameter for animating the movement of each grid cell can be set to 20 frames (e.g., to be performed in half a second or less). For example, assume that a grid of cells has 4 columns and 5 rows of cells for a total of 20 cells and the display screen can display 2 rows, which is a total of 8 cells. Assume that the display area is currently displaying the eight cells of Rows 1 and 2 and in response to a move command, it is determined that each of the four cells of Row 3 are to be moved into the display area. If the frame animation quantity parameter is set to 20, then the movement of each of the at least the four cells of Row 3 into the display area will be completed/presented in 20 frames. The frame animation quantity parameter described herein is only given as an illustrative example. Other types of frame animation quantity parameters may be used as well.

In various embodiments, the grid cells are animated to move in a staggered fashion, meaning that the animation of the movement of each of the grid cells to be moved does not start at the same time. Rather, the animation of the movement of each grid cell begins after a time delay from when the animation of the movement of the previous grid cell had begun. The visual effect of moving the grid cells in a staggered fashion is similar to the grid cells (e.g., in a row) being connected by a string and then tugging the string at one end. In order to achieve this type of animation effect of sequentially moving cells in a grid as if at least some of the cells (e.g., in a row) are connected by a string that is being tugged, the preset frame parameter information also includes a "frame delay parameter." In various embodiments, the "frame delay parameter" is used to add time delays between the sequential movement animation of grid cells in the rows and/or columns of the grid. The frame delay parameter is the measure of delay that a grid cell (or a batch of multiple grid cells) waits after the animation of the movement of the previous grid cell (or batch of multiple grid cells) from the previous grid cell's initial position to its destination position begins. After the frame delay parameter elapses, the movement animation of the subsequent grid cells can begin. In some embodiments, the frame delay parameter is stored in units of time and/or a number of animation frames. In some embodiments, a frame delay parameter is applied for every grid cell that is to be moved except for the first grid cell to be moved. Aside from the first grid cell to be moved, the animation of every subsequent grid cell to be moved from its initial position to its destination position is configured to start according to the frame animation quantity parameter after waiting a frame delay parameter from when the animation of the movement of a previous grid cell (or batch of multiple grid cells) began. In some embodiments, the "frame delay parameter" includes a "row frame delay parameter" and/or a "column frame delay parameter." The "row frame delay parameter" is used to perform waiting in between sequential movement animation of grid cells between different rows and "column frame delay parameter" is used to perform waiting in between sequential movement animation of grid cells between different columns. For example, after the animation of the movement of the first grid cell begins, the row frame delay parameter is used to determine the length of the delay before a grid cell in the same column but an adjacent row relative to the first grid cell is moved and the column frame delay parameter is used to determine the length of the delay before the grid cell in the same row but an adjacent column relative to the first grid cell is moved.

To reiterate, after the first grid cell has been animated to move, the other grid cells do not immediately move. Instead, the movement animation of the second grid cell (or the second batch of multiple grid cells) starts according to the frame animation quantity parameter after a wait that is equal to the length of the frame delay parameter. This process is repeated for the third grid cell and any subsequent grid cells.

The following example describes the process of sequentially moving grid cells in a staggered fashion in response to a move command: The move sequence information that was included in the move command is used to identify the grid cell to move first and then the destination position information included in the move command is used to animate the movement of the first grid cell to its respective destination position in the display area. The animation of the movement of the first grid cell is determined based on the frame animation quantity parameter of the preset frame parameter information. After the movement animation of the first grid cell begins, the display device waits the frame delay parameter before starting the movement animation of the second grid cell (or the second batch of grid cells) to its destination position. After the movement animation of the second grid cell begins, the display device waits the frame delay parameter before starting the movement animation of the third grid cell (or the third batch of grid cells) to its destination position, and so on until all of the grid cells, that should be moved, have been moved. The frame delay data for all of the grid cells except for the first grid cell is calculated according to the frame delay parameter and the move sequence information. As such, all grid cells other than the first grid cell are moved sequentially and in a staggered fashion to their respective destination positions according to the frame animation quantity parameter. In some embodiments, the visual effect of animating the movement of the grid cells as described herein is as if the grid cells were connected by a string that is being tugged from the portion closest to the first grid cell.

Figure 5:
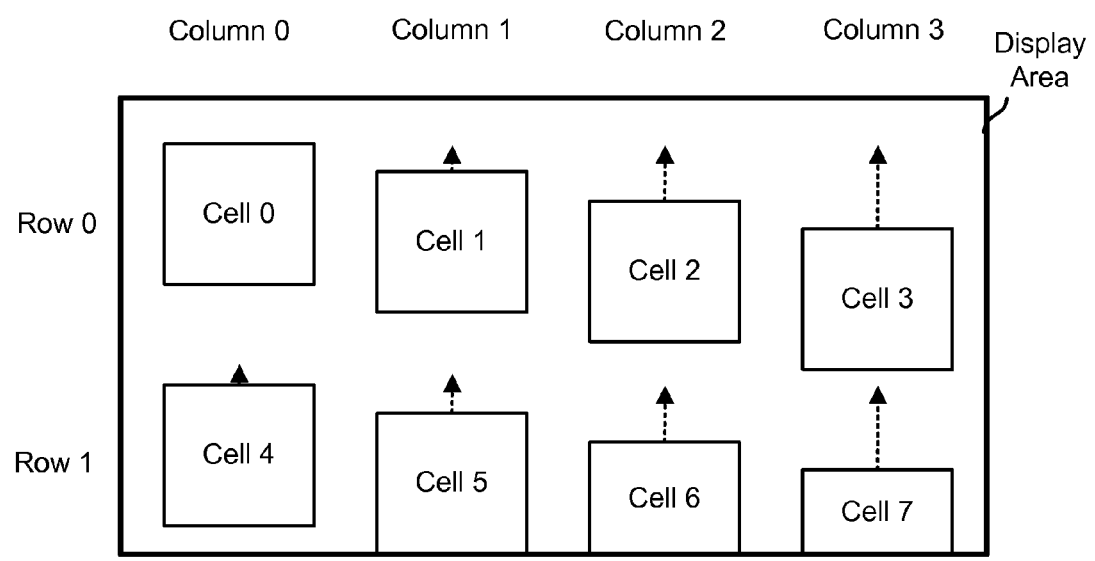
FIG. 5 is a diagram showing an example of animating the movement of various grid cells into a display area in response to a move command.

FIG. 5 is a diagram showing an example of animating the movement of various grid cells into a display area in response to a move command. The example of FIG. 5 shows an example application of process 300 of FIG. 3. In the example of FIG. 5, the display area of the display device (e.g., a smart television) can present up to eight grid cells in two rows of four grid cells each. In the example of FIG. 5, the frame animation quantity parameter is 20 frames, the row frame delay parameter is 2 frames, and the column frame delay parameter is 1 frame. Assume a move command to move grid cells of Rows 0 and 1 into the display area has been received. As such, in response to the move command, the movement of the grid cells of Rows 0 and 1 upwards into the display area is to be animated. In the example of FIG. 5, assume that the first grid cell to move as identified by the move sequence information of the move command is Cell 0 (associated with the (column, row) value of (0, 0)). Based on the frame animation quantity parameter, 20 animation frames are to be used to animate the movement of Cell 0 to its destination position of the top row in the display area at Column 0. The movement animation of every other grid cell is similarly determined based on the frame animation quantity parameter and will not be discussed further in this example. After the movement animation of Cell 0 begins, the other grid cells do not immediately move. After Cell 0 moves a distance of 1 frame, the column frame delay parameter of 1 frame wait for Cell 1 is met and Cell 1 (associated with the (column, row) value of (1, 0)) moves a distance of 1 frame. Then, after Cell 1 moves a distance of 1 frame, the column frame delay parameter of 1 frame wait for Cell 2 is met and Cell 2 (associated with the (column, row) value of (2, 0)) moves a distance of 1 frame. The process continues in this manner until Cell 3 (associated with the (column, row) value of (3, 0)) of the same row is moved. Because Cell 4 belongs to another row, it is moved a distance of 1 frame after waiting a row frame delay parameter of 2 frames relative to the start of the movement animation of the first grid cell, Cell 0. The remaining grid cells (Cells 5, 6, and 7) are moved relative to the start of the movement animation of Cell 4 based on the row frame delay parameter. The visual effect of animating Cells 0 through 7 moving into the two rows of the display area is as if Cells 0 through 3 were connected by a string that was tugged upwards from Cell 0 and as if Cells 4 through 7 were connected by another string that was tugged upwards from Cell 4. As a result, the example of FIG. 5 shows that even after Cell 0 has been moved to its respective destination position, every other grid cell is still moving upwards to reach its respective destination position due to the delayed times at which their movement animation began. The resulting display of new grid cells in the display area is more realistic, smooth-flowing, and lively.

Figure 6:
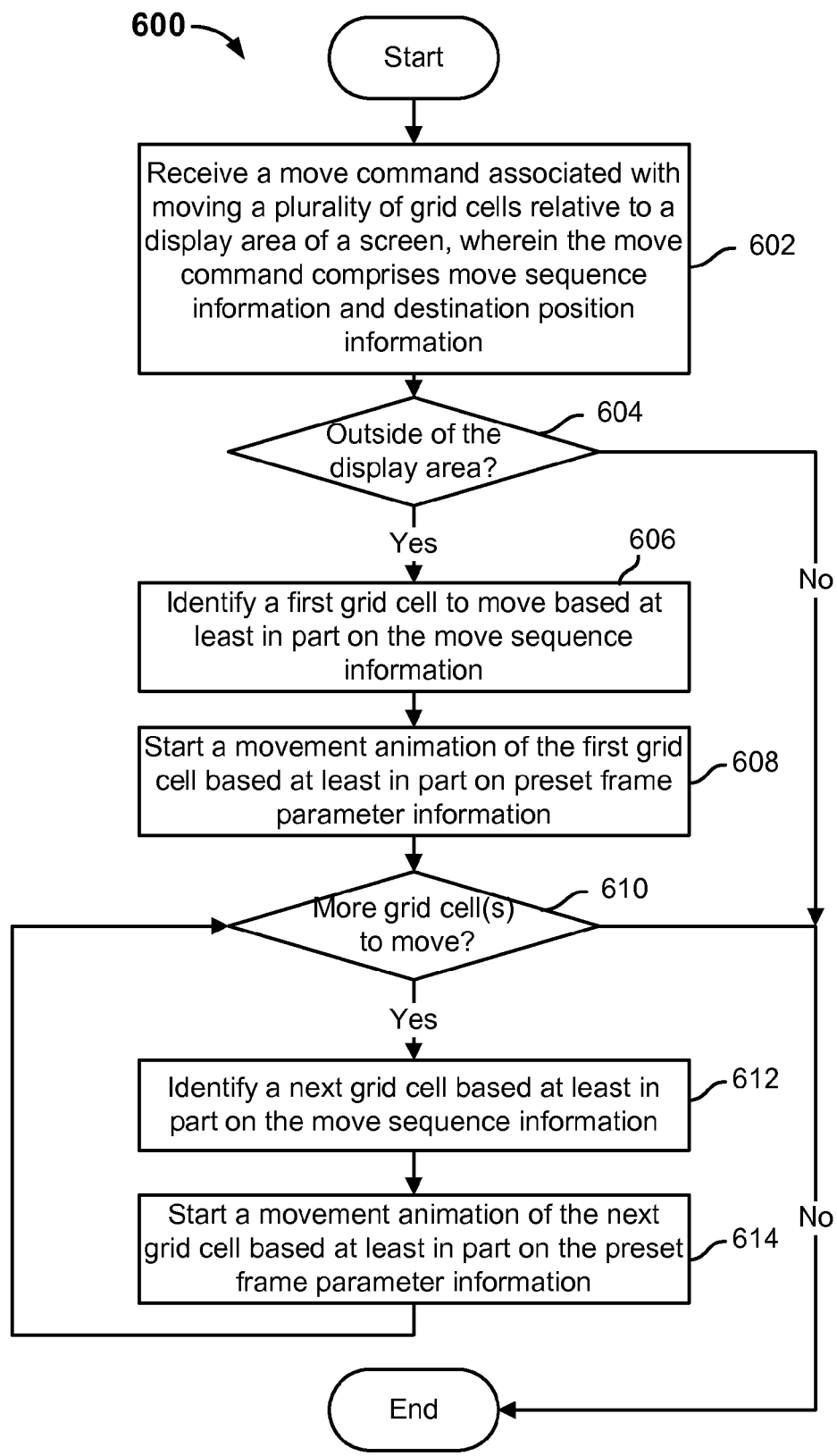
FIG. 6 is a flow diagram showing an example process for animating the movement of various grid cells into a display area in response to a move command.

FIG. 6 is a flow diagram showing an example process for animating the movement of various grid cells into a display area in response to a move command. In some embodiments, process 600 is implemented at system 100 of FIG. 1. In some embodiments, process 300 of FIG. 3 is implemented, at least in part, using process 600.

At 602, a move command associated with moving a plurality of grid cells relative to a display area of a screen is received, wherein the move command comprises move sequence information and destination position information.

At 604, it is determined whether the plurality of grid cells is outside of the display area of the screen. In the event that the grid cells to be moved are already inside the display area, then process 600 ends. Otherwise, if at least one of the grid cells to be moved is not yet inside the display area, then control is transferred to 606.

At 606, a first grid cell to move is identified based at least in part on the move sequence information.

At 608, a movement animation of the first grid cell is started based at least in part on preset frame parameter information. In various embodiments, the preset frame parameter information comprises: a frame animation quantity parameter and a frame delay parameter. In some embodiments, the frame delay parameter comprises: a row frame delay parameter and/or a column frame delay parameter. For example, the row frame delay parameter equals a 2-frame delay and the column frame delay parameter equals a 1-frame delay.

In some embodiments, the animation of movement of various grid cells can be implemented using the GridView control class of the Android operating system.

At 610, it is determined whether there is at least one more grid cell to move into the display area. In the event that there is at least one other grid cell to be moved inside the display area, then control is transferred to 612, at which a next grid cell is identified based at least in part on the move sequence information. Otherwise, if all the grid cells that should be moved have already been moved, then process 600 ends.

At 614, a movement animation of the next grid cell is started based at least in part on the preset frame parameter information. Each grid cell subsequent to the first grid cell is moved based on the frame animation quantity parameter after waiting the frame delay parameter.

By using process 600, when a user browses through the grid cells using either a grid-scrolling or page-turning grid display mode, the movement of grid cells will be animated as they move into the display area, which will provide the user with a more entertaining and lively experience.

Figure 7:
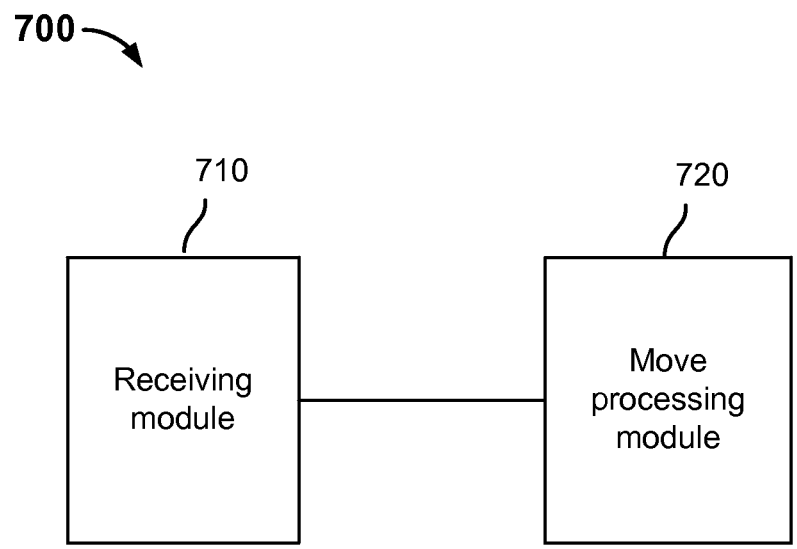
FIG. 7 is a flow diagram showing an embodiment of a system for animating content display.

FIG. 7 is a flow diagram showing an embodiment of a system for animating content display. In the example, system 700 includes receiving module 710 and move processing module 720.

The modules can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Receiving module 710 is configured to receive a move command for moving a plurality of grid cells. In various embodiments, the move command comprises: move sequence information and destination position information. The move sequence information is to be used by move processing module 720 to identify the first grid cell to move and determine the movement direction of the grid cells. In some embodiments, the move command may be associated with the grid-scrolling display mode or the page-turning grid display mode.

Move processing module 720 is configured to move each of the plurality of grid cells sequentially relative to the display area, in response to the move command, based at least in part on the preset frame parameter information. In various embodiments, the frame parameter information comprises: a frame animation quantity parameter and a frame delay parameter. In some embodiments, the frame delay parameter comprises: a row frame delay parameter and/or a column frame delay parameter.

In some embodiments, move processing module 720 further comprises:

A first move processing module (not shown in the diagram) that is configured to identify the first grid cell to be moved according to the move sequence information. The first move processing module is also configured to start the movement animation of the first grid cell to its respective destination position according to the frame animation quantity parameter.

A second move processing module (not shown in the diagram) that is configured to sequentially move each of the grid cells other than the first grid cell to its corresponding destination position according to the frame delay parameter and the frame animation quantity parameter after the movement animation of the first grid cell has started.

In some embodiments, system 700 further comprises:

An acquiring module (not shown in the diagram) that is configured to acquire the initial position information for the grid cells and to determine the frame animation quantity parameter according to the initial position information and the destination position information.

Figure 8:
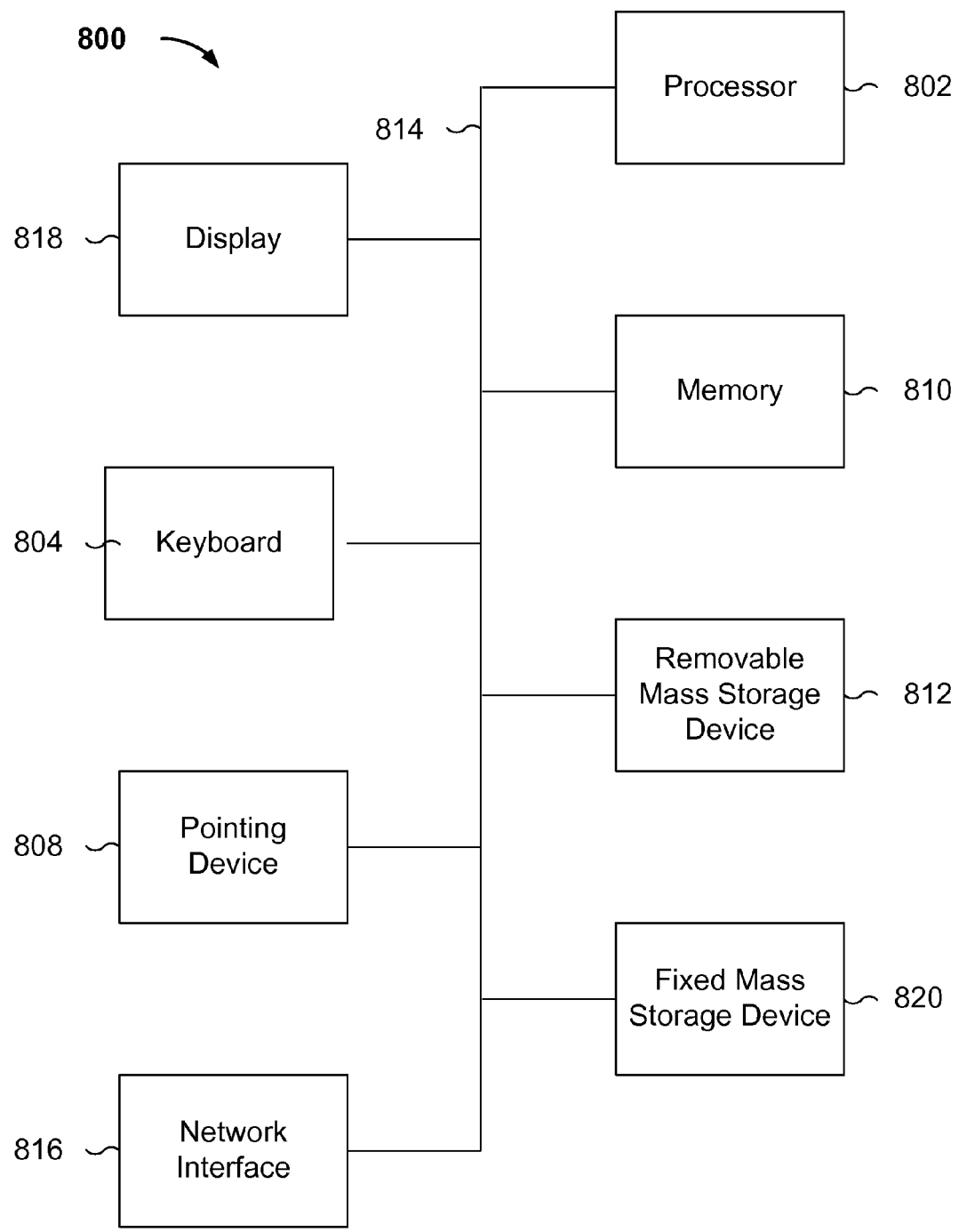
FIG. 8 is a functional diagram illustrating an embodiment of a programmed computer system for implementing animation of content display.

FIG. 8 is a functional diagram illustrating an embodiment of a programmed computer system for implementing animation of content display. As will be apparent, other computer system architectures and configurations can be used to animate content display. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In various embodiments, display 818 includes a display area in which up to a predetermined number of grid cells can be displayed at a time.

Processor 802 is coupled bi-directionally with memory 810, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800 and is coupled either bi-directionally (read/write) or uni-directionally (read only) to processor 802. For example, storage 812 can also include computer readable media such as magnetic tape, flash memory, PC-CARDS, portable mass storage devices, holographic storage devices, and other storage devices. A fixed mass storage 820 can also, for example, provide additional data storage capacity. The most common example of fixed mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display 818, a network interface 816, a keyboard 804, and a pointing device 808, as well as an auxiliary input/output device interface, a sound card, speakers, and other subsystems as needed. For example, the pointing device 808 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

A person skilled in the art should understand that the embodiments of the present application can be provided as methods, systems, or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

In one typical configuration, computer equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media ("transitory media"), such as modulated data signals and carrier waves.

The above-described are merely embodiments of the present application and are not for limiting the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a receiver to receive a move command associated with moving a plurality of grid cells relative to a display area of a screen, wherein the plurality of grid cells comprises pieces of content; and
   a processor coupled with the receiver to, in response to the move command, move each of at least a subset of the plurality of grid cells sequentially relative to the display area based at least in part on preset frame parameter information, wherein the preset frame parameter information comprises a frame animation quantity parameter and a frame delay parameter.

2. The system of claim 1, wherein the screen is associated with a television set.

3. The system of claim 1, wherein the move command comprises move sequence information and destination position information.

4. The system of claim 3, wherein to move each of the at least subset of the plurality of grid cells sequentially relative to the display area includes to identify a first grid cell to move based at least in part on the move sequence information.

5. The system of claim 4, wherein the processor is configured to move the first grid cell based at least in part on the frame animation quantity parameter and the destination position information.

6. The system of claim 5, wherein the processor is configured to identify a second grid cell to move based at least in part on the move sequence information.

7. The system of claim 6, wherein the processor is configured to move the second grid cell, after a wait time determined based at least in part on the frame delay parameter elapses, based at least in part on the frame animation quantity parameter and the destination position information.

8. The system of claim 1, wherein the frame delay parameter comprises at least one of a row frame delay parameter and a column frame delay parameter.

9. The system of claim 1, wherein the move command is associated with a grid-scrolling display mode, a page-turning display mode, or both.

10. A method, comprising:
    receiving a move command associated with moving a plurality of grid cells relative to a display area of a screen, wherein the plurality of grid cells comprises pieces of content; and
    in response to the move command, moving, using a processor, each of at least a subset of the plurality of grid cells sequentially relative to the display area based at least in part on preset frame parameter information, wherein the preset frame parameter information comprises a frame animation quantity parameter and a frame delay parameter.

11. The method of claim 10, wherein the screen is associated with a television set.

12. The method of claim 10, wherein the move command comprises move sequence information and destination position information.

13. The method of claim 12, wherein moving each of the at least subset of the plurality of grid cells sequentially relative to the display area includes identifying a first grid cell to move based at least in part on the move sequence information.

14. The method of claim 13, further comprising moving the first grid cell based at least in part on the frame animation quantity parameter and the destination position information.

15. The method of claim 14, further comprising identifying a second grid cell to move based at least in part on the move sequence information.

16. The method of claim 15, further comprising moving the second grid cell, after a wait time determined based at least in part on the frame delay parameter elapses, based at least in part on the frame animation quantity parameter and the destination position information.

17. The method of claim 10, wherein the frame delay parameter comprises at least one of a row frame delay parameter and a column frame delay parameter.

18. The method of claim 10, wherein the move command is associated with a grid-scrolling display mode, a page-turning display mode, or both.

19. A computer program product, the computer program product being embodied in a non-transitory computer readable storage medium and comprising computer instructions for:
    receiving a move command associated with moving a plurality of grid cells relative to a display area of a screen, wherein the plurality of grid cells comprises pieces of content; and
    in response to the move command, moving each of at least a subset of the plurality of grid cells sequentially relative to the display area based at least in part on preset frame parameter information, wherein the preset frame parameter information comprises a frame animation quantity parameter and a frame delay parameter.

* * * * *